Nov. 10, 1953　　　W. STELZER　　　2,658,347
HYDRAULIC BOOSTER BRAKE SYSTEM
Filed Jan. 9, 1950　　　2 Sheets-Sheet 1
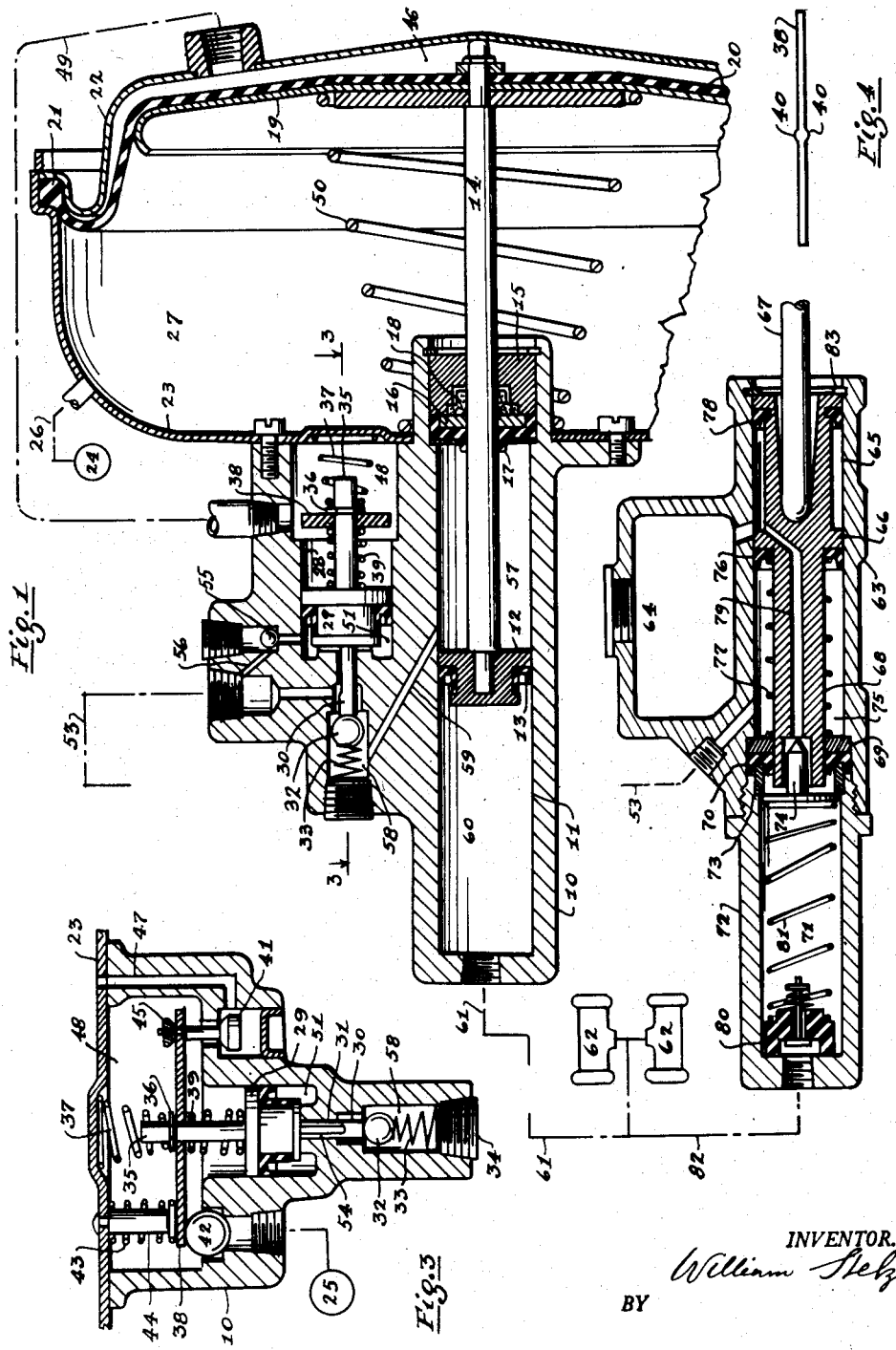
INVENTOR.
William Stelzer
BY

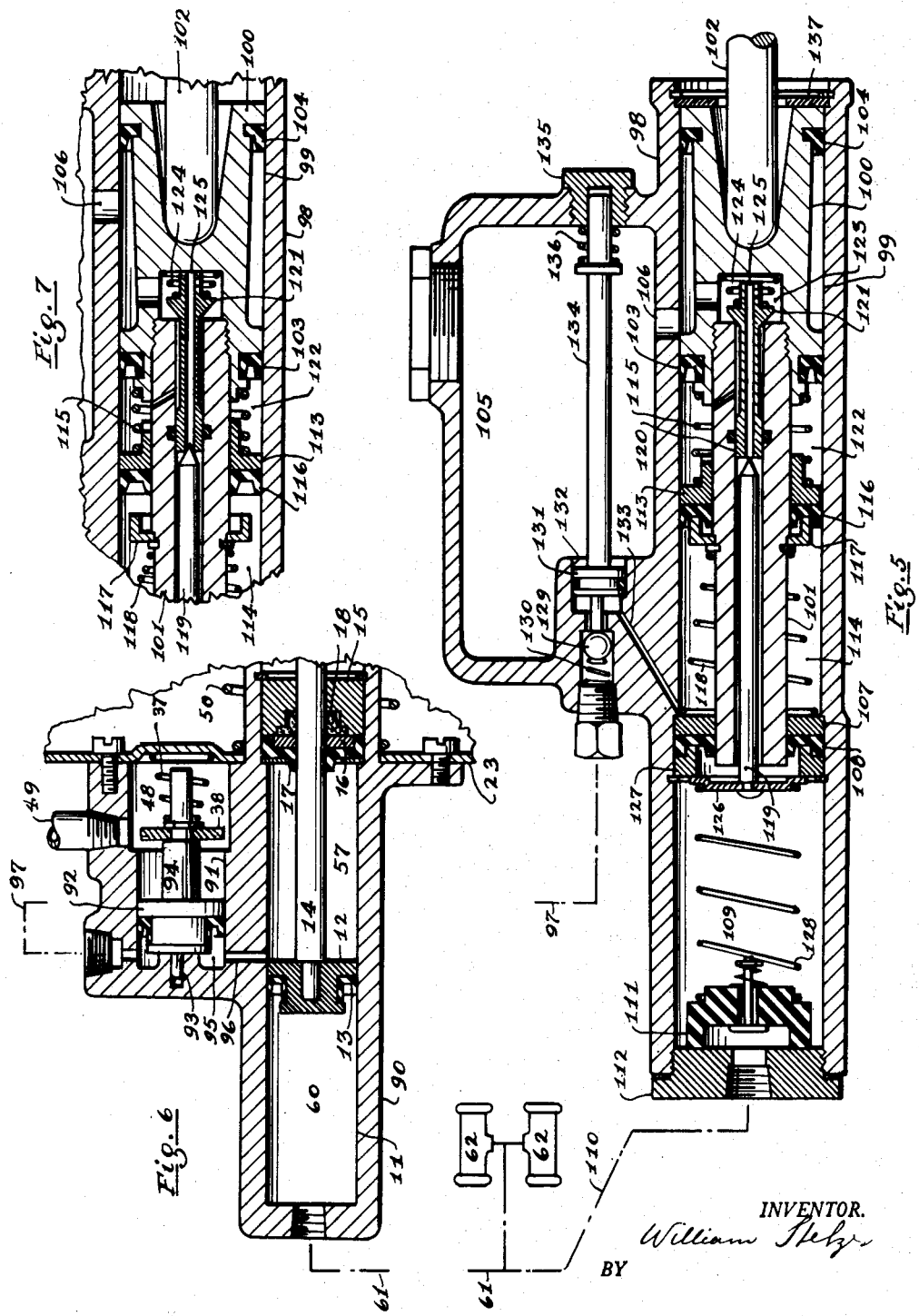

Patented Nov. 10, 1953

2,658,347

UNITED STATES PATENT OFFICE 2,658,347

HYDRAULIC BOOSTER BRAKE SYSTEM

William Stelzer, Summit, N. J.

Application January 9, 1950, Serial No. 137,501

17 Claims. (Cl. 60—54.5)

This invention relates to a hydraulic booster brake system, and more particularly to an improvement over the braking system disclosed in my co-pending application No. 151,119 filed March 22, 1950 where by manual power a small amount of fluid is forced to the wheel cylinder of an automotive vehicle to apply the brakes, and a larger amount of fluid is displaced at negligibly low pressure to control a power booster to augment the amount of fluid transmitted to the wheel cylinders. The improvement noted consists of means whereby the manually generated high pressure can be transmitted to the wheel cylinders after the power means are unable to further augment the amount after maximum power has been reached.

In this basic system operating on the new principle which may be termed "volume follow-up," a manually operated master cylinder is employed having many elements similar to a conventional two-stage or compound master cylinder. All the known types of two-stage or compound master cylinders are based on a change, i. e., reduction in output volume for a given pedal travel when a certain pressure is reached. The result is the same as a change in pedal ratio which takes place somewhere during the operation. The advantage gained is a reduction in pedal pressure when the hydraulic pressure is high, but the change felt through the pedal is objectionable.

The object of the present invention is to obtain a similar advantage, but without the change in ratio which would be noticeable in the application of the brake pedal. The advantage resides in the continuance of delivery of hydraulic fluid to the wheel cylinders by manual power after the power means fail to further augment the volume of fluid transmitted to the wheel cylinders, the reaction on the brake pedal remaining proportionate to the wheel cylinder pressure. Since a high braking pressure may be produced even after failure of the power means to augment the volume transmitted to the wheel cylinders, it is obvious that the braking system may be constructed with a smaller booster mechanism, thus reducing the cost.

Another object is to provide means for accommodating the control fluid after the booster mechanism runs out of power, and means to prevent the increased pressure in the wheel cylinders to react on the booster when the pressure produced by the latter is too low.

A further object is to safeguard sufficient output of hydraulic fluid in case of power failure by forcing the control fluid displaced by the master cylinder to be transmitted under higher pressure to the wheel cylinders, until a pre-determined pressure is reached.

A still further object is the control of the residual pressure, where the pressure of the control fluid is completely relieved when the system is in the released position.

Other objects and advantages of the invention will be apparent from the following detailed description considered in connection with the accompanying drawings submitted for the purpose of illustration and not intended to define the scope of the invention, reference being had for that purpose to the subjoined claims. In the drawings, wherein similar reference characters refer to similar parts throughout the several views:

Fig. 1 is a cross-sectional view of the power operated booster mechanism;

Fig. 2, a cross-sectional elevation of the manually operated master cylinder, used in connection with the booster shown in Fig. 1;

Fig. 3, a section taken on line 3—3 of Fig. 1;

Fig. 4, a top end view of the valve actuating lever shown in Fig. 1;

Fig. 5, a cross-sectional elevation of a special master cylinder of modified construction embodying the novel elements otherwise shown in Fig. 1;

Fig. 6, a fragmentary sectional view of the booster used in connection with the master cylinder shown in Fig. 5; and Fig. 7, a fragmentary sectional view similar to Fig. 5 but showing the elements in a position assumed during operation.

Before explaining in detail the present invention it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not limitation.

Describing the invention now in detail, and referring to Fig. 1, there is shown a power operated booster mechanism having a cylinder or body comprising a bore 11 in which slides a piston 12 provided with a seal 13 and secured to a piston rod 14 passing through bearings 15 and 16 and seals 17 and 18 which are all securely retained at the end of body 10. The other extremity of piston rod 14 carries a reinforced diaphragm plate 19 and a diaphragm 20 whose outer bead 21 is clamped between cover 22 and casing 23 secured to body 10.

Power piston or diaphragm plate 19, diaphragm 20, cover 22, and casing 23 constitute the motor mechanism of the booster. Cover 22 and casing 23 are secured together in any suitable manner, the method shown having been explained in detail in the co-pending application referred to. As a source of power for the motor mechanism the differential pressure between a source of low pressure 24 and a source of higher pressure 25 is used. Thus 24 may represent a source of vacuum such as the intake manifold of an internal combustion engine, connected through line 26 to chamber 27 of the motor mechanism. Body 10 also has a bore 28 in which slides a sealed control piston 29 having a piston rod or stem 30 extending through bore 31 to unseat ball valve 32 urged toward its seat by a light spring 33 retained by a plug 34. The other end of the control piston has a rod extension 35 with a snap ring or shoulder 36 engaging a conical return spring 37 urging piston 29 towards the left into the starting position. Rod 35 also serves to support and operate valve lever 38 held against ring 36 by a spring 39 which is considerably stiffer than spring 37. The valve lever or plate 38 has raised portions 40 along its pivotal axis, as shown in Fig. 4. They facilitate the rocking action of the lever during actuation of vacuum valve 41 and atmosphere valve 42. The latter is urged into a closed position by a spring 43 guided by a stud 44 secured to a casing 23. Valve 41 has its stem pivotally secured to lever 38 as a small clearance is permitted between nut 45 and lever 38 so that the valve can find its proper position when seated. Due to return spring 37 valve 41 is unseated when the brakes are in the released position, whereby both sides of the motor mechanism, chambers 27 and 46, are equalized and exposed to low pressure, as they are connected together through passage 47, chamber 48, and line 49. In this position the power piston of the motor mechanism is held against cover 22 by a return spring 50. Actuation of the valves to cause energization of the motor mechanism is effected by hydraulic pressure in chamber 51, generated by the manually operated master cylinder shown in Fig. 2, the hydraulic pressure being transmitted through line 53 through a passage in the form of a groove 54 in extension 30 to chamber 51. It will be noted that groove 54 does not extend the entire length of extension 30. This is to provide a sufficient passage for operation of piston 29 to control the valves, but to effect a restriction during overtravel of piston 29, a slow flow of fluid being then permitted through the clearance between extension 30 and bore 31. Valve lever 38 is permitted a certain travel with piston 29 until it rests against stud 44 and low pressure valve 41 is closed, but piston 29 is capable of continuing the movement in response to pressure in chamber 51 by compressing springs 39 and 37 until rod 35 stops against casing 23. In order to provide the restriction only in one direction, I incorporate a check valve 55 which allows piston 29 to return quickly by allowing fluid to pass through hole 56 into line 53. The latter is also in communication with primary chamber 57 of the booster through check valve 32, chamber 58, and passage 59. The secondary chamber 60 is connected through line 61 to the wheel cylinders 62 which actuate the brakes.

The master cylinder shown in Fig. 2 is similar to that shown in my co-pending application Ser. No. 151,119. It comprises a cylinder body 63 having a reservoir 64 and a bore 65 in which slides a piston 66 actuated by a push rod 67 and connected to the usual brake pedal, not shown. One extension of the piston forms a high pressure plunger 68 passing through bearing 69 and seal 70 into chamber 71 formed by a cylinder or hollow plug 72 secured to cylinder body 63 and retaining a sleeve or ring 73 which secures seal 70 in place and also serves as a stop for valve 74 so that it is unseated when the master cylinder is in the released position, as shown. Chamber 75 contains the control fluid. Piston 66, which has a seal 76 retained by a return spring 77, displaces fluid from chamber 75 to primary chamber 57 of the booster and to chamber 51 to induce energization of the motor mechanism. The space between seal 76 and primary seal 78 is open to reservoir 64 to prevent any possibility of air being drawn into the system. A passage 79 leads from this space through plunger 68 so that when valve 74 is open chamber 71 is in communication with the reservoir whereby the pressure in chamber 71 is completely relieved. A residual valve 80 yieldingly held against the bottom of the bore of plug 72 by spring 81 assures a residual pressure in the wheel cylinders which are connected to plug 72 by means of line 82, the latter being also connected to line 61 so that the pressures in chambers 60 and 71 are the same. Spring 81 serves the dual purpose of tending to seat the residual valve as well as valve 74, the latter seating when plunger 68 is moved toward the left during a brake application. The displacement of fluid from chamber 71 to the wheel cylinders is permitted by the check valve built into the residual valve, this construction being conventional, it need not be further described. In the return stroke, the piston is arrested in the proper position by stop ring 83.

In the modification shown in Figs. 5, 6, and 7 the elements which produce the desired results are located in the master cylinder instead of the booster. Accordingly, in the booster shown in Fig. 6 valves 32 and 55, as well as spring 39, are eliminated, but the motor mechanism and its valve arrangement are the same as shown in Figs. 1 and 3.

Cylinder body 90 has a bore 91 in which slides a modified control piston 92 having a central guide pin 93 and a rod extension 94 carrying valve actuating lever 38 which is connected to the valves of the motor mechanism in a similar manner as shown in Fig. 3. Spring 37 urges the control piston toward the left to assume the "off" position, where the motor mechanism is deenergized. In this embodiment the control piston moves only a very short distance, which is enough to provide sufficient valve movement. Therefore, rod 94 extends to within a short distance of casing 23 so that it is arrested by the latter at the end of the stroke preferably before lever 38 touches stud 44. Rod 94 is stepped to provide a shoulder against which lever 38 rests and on which it may rock. To enable the lever to rock freely, snap ring 36 is located to allow a small clearance between it and raised portion 40 on which the lever rocks. The hydraulic fluid in chamber 95 communicates with chamber 57 through passage 96 and with the master cylinder through line 97.

The modified master cylinder shown in Fig. 5 comprises a cylinder body 98 having a bore 99 in which slides a compound piston consisting of a low pressure piston 100 and a high pressure plunger or piston 101 secured together and actuated by a conventional push rod 102. The low pressure piston has two seals 103 and 104, the space between which is permanently open to reservoir 105 through hole 106. Plunger 101 extends through a bearing 107 and seal 108 to enter into a high pressure chamber 109 connected to the wheel cylinders 62 through line 110 with a residual valve 111 interposed seated against end plug 112. An auxiliary piston 113 also slides in bore 99 but it furthermore is capable of sliding on plunger 101 in yielding to a high pressure in chamber 114 by compressing spring 115 which ordinarily presses piston 113 and its seal 116 against collar 117 firmly secured to plunger 101. A return spring 118 urges the compound piston into its released or starting position to rest against a fixed stop plate 137. In this position shown chamber 109 is relieved of pressure as it is in communication with reservoir 105, needle valve 119 being unseated from piston 120 sliding in a central bore in plunger 101, one end of piston 120 forming a valve 121 whose object is to control the relief of fluid from chamber 122 to the reservoir, for which purpose a hole is provided in plunger 101 to lead from chamber 122 to the clearance around the stem of valve 121 and another hole to connect valve chamber 123 with the space between seals 103 and 104. A valve spring 124 urges valve 121 into a closed position and also opposes the hydraulic pressure acting on piston 120 from chamber 109 when valve 119 has closed the central passage 125 which extends through piston 120 and valve 121. Spring 124 is proportioned in relation to the area of piston 120 so that valve 121 opens at a predetermined pressure which must be sufficiently high for a safe brake application but below the maximum output pressure of the booster mechanism. The purpose of piston 120 and valve 121 is merely to assure sufficient output of fluid by the master cylinder in case of power failure. Valve 119 has secured to it a disc or plate 126 to serve as a stop against sleeve 127 used to retain seal 108. Disc 126 also engages valve spring 128 which urges valves 119 and 111 into a seated position. A ball valve 129 urged into a seated position by a light spring 130 is arranged in the cylinder body. It is the equivalent of valve 32 in Fig. 1 as its function is to prevent the return of fluid from chamber 57 after the booster is unable to match the manually generated pressure. A piston 131 provided with a trip rod to engage ball 129, slides in bore 132 and is subject to the hydraulic pressure from chamber 114 through passage 133. A long rod 134 part of piston 131 extends through the reservoir to slide in plug 135, a spring 136 urging the piston toward the left to oppose the hydraulic pressure transmitted from chamber 114 and to open valve 129. The spring is so proportioned that it yields only when the hydraulic pressure in chamber 114 exceeds the normal operating pressure necessary for the operation of the valves of the motor mechanism.

Describing now the operation of the booster and master cylinder shown in Figs. 1 and 2 and assuming that they are in the released position as shown on the drawing, depression of the brake pedal by the operator causes push rod 67 and piston 66 with its plunger 68 to move toward the left to displace fluid from chambers 75 and 71. A very short movement is required before valve 74 is closed so that pressure can be generated in chamber 71 and the fluid transmitted through line 82 to the wheel cylinders to apply the brakes. The fluid displaced from chamber 75 is transmitted through line 53 to chamber 51 to act on piston 29 which in turn compresses spring 37 and pushes plate 38. Due to the resistance of spring 43 lever 38 rocks about ball 42 to first close valve 41 to separate chamber 46 from 27. After valve 41 is closed, further movement of lever 38 is possible only by compressing spring 43 to allow pressure valve 42 to open, whereby air from pressure source 25 is transmitted through chamber 48 and connection 49 to chamber 46 to energize the motor mechanism and to urge piston 12 of the booster towards the left, displacing fluid from chamber 60 to be transmitted under pressure through line 61 to the wheel cylinders to assist in applying the brakes. The fluid transmitted from chamber 75 of the master cylinder not only enters into chamber 51, but may also flow into chamber 57 through passage 59. Thus the volume of control fluid transmitted from chamber 75 determines the booster output from chamber 60, because an increase in fluid transmitted to chamber 57 would produce a build-up in pressure and cause piston 29 to yield to urge the motor mechanism to increase the power and thereby step up the movement of piston 12 toward the left. On the other hand a decrease in volume of fluid transmitted to primary or fluid receiving chamber 57 would result in a reduction in pressure and a consequent return of piston 29 toward the released position to reduce the power of the motor mechanism and to slow down or reduce the output from chamber 60. In actual operation the pressure differences of the control fluid while the booster is in operation are very small and the pressure is so low that the manual effort to produce it is negligible. The effort to actuate piston 68 is reduced in proportion to the amount of fluid transmitted by it to the wheel cylinders. The total volume of fluid received by the latter is equivalent to the output from chamber 71 of the master cylinder and the displacement from chamber 75 plus the amount of fluid displaced by piston rod 14, or it may be stated that the output from chamber 60 is equivalent to the displacement from chamber 75 plus the fluid displaced by piston rod 14. Accordingly the output of the booster is greater than the amount of fluid it receives from the master cylinder. This is an advantage which will become apparent when considering the next stage of operation when the booster runs out of power and the only fluid transmitted to the wheel cylinders is from chamber 71. If 25 represents a source of atmospheric pressure, and 24 a vacuum, it is obvious that the power of the motor mechanisms cannot be increased indefinitely. It is limited by the diameter of the diaphragm. When atmospheric pressure is reached in chamber 46 the power cannot be further increased. This is usually termed power run-out. Supposing now that this occurs, and that the operator increases the pressure on the brake pedal to continue the travel of piston 66 and plunger 68 toward the left, a higher pressure is produced in chamber 71 but simultaneously the pressure in chamber 75 is built up because piston 12 fails to follow in response to the valve action. Consequently piston 29 continues toward the right and compresses springs 39 and 37. Groove 54 of stem 30 enters totally into bore 31 so that a restriction is introduced which retards the flow of fluid into chamber 81, the only passage being provided by the clearance around stem 30 in bore 31. After spring 39 starts to compress, valve 32 becomes seated so that the hydraulic fluid from chamber 87 is prevented from backing up to return to chamber 75 or into 51. If this action occurs too early, fluid can still flow from line 53 into chamber 87 as ball 32 then acts as a check valve. With valve 32 closed, and the booster run out of power, the only discharge is now from chamber 71 by manual power. No change has taken place in the master cylinder, the reaction on the brake pedal is still proportional to the hydraulic pressure in the wheel cylinders, and the fluid from chamber 75 under still comparatively low pressure as it flows into chamber 51. Thus the fluid transmitted to the wheel cylinders is of a reduced amount. Since at this stage the brake shoes are fully expanded any further application is mostly a matter of increased pressure without any appreciable increase in displacement so that only a very small movement is required to produce an increased pressure. Thus the travel of piston 29 until rod 35 hits casing 23 is adequate to accommodate the fluid displaced from chamber 57 into chamber 51. In the retractile movement, when the brake pedal is released and piston 66 and plunger 68 return toward the starting position, the pressure in chamber 75 becomes reduced, so that by virtue of springs 37 and 39 piston 29 is moved toward the left and fluid from chamber 51 flows back to chamber 75. This is facilitated by check valve 55 which allows the fluid to by-pass the restriction around stem 30 so that piston 29 can return quickly. When valve 32 is opened again by stem 30 the hydraulic pressure in chamber 57 is again approximately the same as it was when the valve closed, and it is the same as in chamber 75 so that practically no effort is required to unseat ball 32. After this the booster is again in operation as though no change had ever taken place. A continued release of the brake pedal and consequent reduction in pressure in chamber 75 causes piston 29 to retract further toward the left in response to spring 37 whereby valve 42 first closes, due to spring 43, and then valve 41 opens to release the air from chamber 46 via connection 49, chamber 48, passage 47, and chamber 27 toward the source of low pressure. Helped by the pressure in chamber 60, the booster now returns toward the released or starting position in a true follow-up with the piston of the master cylinder. As piston 66 and plunger 68 reach the starting or released position, the disc shaped part of valve 74 comes to rest against sleeve 73 to open valve 74, so that chamber 71 is again in communication with the master cylinder. Any pressure in the control circuit is relieved by passage of fluid from chamber 75 past the inner lip of seal 70 into chamber 71. Chamber 60 and wheel cylinders 62 are relieved of pressure only until residual pressure is reached, residual valve 80 tended by spring 81 preventing any further release of fluid from line 82 to the master cylinder.

Operation of the system illustrated in Figs. 5, 6, and 7, will now be described. Figs. 5 and 6 show the master cylinder and booster in the released or starting position. Depression of the brake pedal by the operator moves push rod 102, piston 100 and plunger 101 toward the left, the latter entering into chamber 109 to displace fluid from there to be transmitted to the wheel cylinders 62 to apply the brakes. In the initial movement needle valve 119 is seated on piston 120 to shut off the passage from high pressure chamber 109 to the reservoir. Piston 113 moves in unison with plunger 101 as it is held against collar 117 by the stiff spring 115. The fluid displaced from chamber 114 is transmitted through passage 133 and line 97 to chamber 95 to act on piston 92 which is forced to move to the right by compressing spring 37 and actuating lever 38 to operate the valves of the motor mechanism as already described. The fluid is also transmitted through passage 96 into chamber 57 of the booster. As the motor mechanism is energized due to the valve action induced by the pressure in chamber 95, piston 12 moves toward the left to displace fluid from chamber 60 to be transmitted to the wheel cylinders to apply the brakes. The same volume follow-up action takes place as already described before in reference to Figs. 1 and 2. The fluid from control chamber 114 is displaced into chamber 57, and any increased pressure in the latter due to a relative advance of the master cylinder piston is immediately translated into increased energization of the motor mechanism in chamber 57, or any decreased pressure due to a retardation of the master cylinder piston is translated into decreased power of the motor mechanism. After a pre-determined pressure is attained which should be sufficiently high to assure a safe brake application, piston 120 yields to the pressure in chamber 109 and moves toward the right by compressing spring 124 and unseating valve 121 until the stem of the latter rests against the bottom of chamber 123, valve 119 having moved with piston 120 and remaining seated. Chamber 122 is now open to the reservoir. After the power run-out takes place, i. e., where the force exerted by the motor mechanism through piston rod 14 is unable to overcome the hydraulic pressure in chamber 60 acting on piston 12, the pressure of the control fluid is increased. As soon as the hydraulic pressure is slightly higher than the pressure necessary to move piston 92 for valve action, piston 131 yields by compressing spring 136, thus closing valve 129 to prevent return of fluid from chamber 57. Further movement of piston 100 and plunger 101 toward the left produces an increased pressure in chamber 109. The amount of fluid displaced is very small as the brakes are fully applied so that it is mostly a matter of pressure and not movement. During this slight movement the pressure in chamber 114 is prevented from building up as piston 113 yields and moves away from collar 117 and compresses spring 115. The position is illustrated in Fig. 7. Fluid is displaced from chamber 122 past valve 121 to reservoir 105. Spring 115 is an element of the construction equivalent to spring 39 of Fig. 1, and piston 113 may be compared with piston 29, the latter, however, serving a double duty by also performing the function of piston 92. While the hydraulic pressure in the wheel cylinders is thus increased, and the fluid in chamber 57 is locked it is apparent that the pressure of the hydraulic fluid acting on piston 92 is increased. The end of piston rod is therefore pressed against casing 23, stud 44 in this embodiment serving only as a guide for spring 43 and not as a stop for valve lever 38. If the operator releases the brake pedal to start piston 100 and plunger 101 on their retractile movement toward the starting position, piston 113 is allowed to move toward collar 117 by force of spring 115, fluid then being drawn back into chamber 122 either past valve 121 or past the outer lip of seal 103. After piston 113 and seal 116 are up against collar 117 to assume their original position, any further retractile movement of the compound piston reduces the pressure in chamber 114 and immediately allows piston 131 to be moved toward the left by spring 136 to unseat ball 129. During the retractile movement described the hydraulic pressure in the wheel cylinders has been gradually reduced to the pressure that existed before valve 129 closed, and consequently the pressure in chamber 57 was also reduced to a pressure which existed before. As the compound piston of the master cylinder continues further towards the released position, the pressure in chamber 114 becomes reduced so that the lower pressure acting on control piston 92 allows the latter to move toward the left and to thereby operate the valves to reduce the power of the motor mechanism whereby the retractile movement of the booster is started, to follow the retractile movement of the master cylinder. After the hydraulic pressure in chamber 109 has become lower, piston 120 has moved again toward the left by force of spring 124 to close valve 121. Before piston 100 comes to rest against stop ring 137, disc 126 of valve 119 is arrested by sleeve 127 and valve 119 becomes unseated whereby chamber 109 is in communication with resesvoir 105.

If a brake application is made in case of a power failure, where the booster is not capable of augmenting the output of fluid by the master cylinder, it is necessary that the fluid displaced from chamber 114 is also transmitted to the wheel cylinders. The fluid displaced from chamber 114 is forced into chamber 109 past the inner lip of seal 108, or past the outer lip of seal 13. Piston 113 is unable to move away from collar 117 because the outlet from chamber 122 is blocked since valve 121 is closed. It opens only later, when the brakes are fully applied and the hydraulic pressure is high. Due to the greater manual effort necessary it can safely be assumed that such higher pressure would rarely be produced, but if the pressure is actually reached where valve 121 opens, the master cylinder will act as a two stage device and will convert to the second stage by relieving the pressure in chamber 122 and consequently also in chamber 114 as spring 115 compresses, so that the reaction on the brake pedal will be reduced. When the brake pedal is released and piston 100 and plunger 101 return toward the starting position, fluid is drawn by suction from the reservoir into chambers 122 and 114. It is able to pass past the outer lips of seals 103 and 116, a sufficient clearance existing between the pistons and bore 99. The main volume of the fluid returning from the wheel cylinders is not released until the master cylinder piston has reached the starting position where valve 119 is lifted so that the excess fluid is released through the central bore in plunger 101 to replenish reservoir 105. While it may be objectionable that the brakes are fully released only after the brake pedal has reached the "off" position, the condition would exist only in an emergency and would not affect the safety of the brakes. In considering the operation of the construction shown in Figs. 1 and 2 in case of power failure, a similar action takes place as just described, except that in this embodiment plunger 120 and valve 121 are omitted. In its place the restriction around stem 30 is introduced. Its effect is that if the brake pedal is depressed very rapidly so that a considerable pressure is suddenly produced in the control circuit, the premature overtravel of piston 29 is prevented since the restriction acts like a damper. This is also effective when there is no power failure but the motor mechanism cannot follow rapidly enough due to an extremely rapid application of the brake pedal.

Since the function and the essential elements of the two different embodiments are the same, it appears evident that the invention does not depend on the location of the devices which lock the booster after the power run-out and accommodate the control fluid displaced from the master cylinder. The essential elements are first, means (32 or 129 and 29 or 131) to prevent the release of fluid from the primary chamber of the booster (57) or in general, to prevent the flow of fluid from the wheel cylinders to the booster after the latter has run out of power, second, yielding means (113 or 29) to accommodate the control fluid displaced from the master cylinder or to provide for the relief of its pressure after the booster has run out of power, and, third, means to prevent the sudden relief of pressure of the control fluid displaced by the master cylinder (120, 121, 123, or the restriction or clearance around stem 30) in case of lag of power of the motor mechanism or a too rapid application of the brake pedal.

I claim:

1. In a braking system having wheel cylinders to apply the brakes, a manually operated high pressure fluid displacing device to transmit fluid to said wheel cylinders to apply the brakes, a power operated booster comprising fluid displacing means adapted to transmit fluid to said wheel cylinders to augment the amount of fluid transmitted by said manually operated high pressure fluid displacing device, a manually operated low pressure fluid displacing device adapted to operate in unison with said first device, means responsive to the volume of fluid displaced by said low pressure fluid displacing device to control the power of said booster to transmit a proportionate amount of fluid to said wheel cylinders, said means responsive to the volume of fluid having an expansible chamber to receive fluid from said low pressure fluid displacing device when said booster is unable to transmit more fluid to said wheel cylinders due to power runout, resilient means tending to reduce the volume of said expansible chamber, and a valve closed by a predetermined expansion of said expansible chamber to check the return of fluid from said wheel cylinders to said fluid displacing means of said booster.

2. In a braking system having wheel cylinders to apply the brakes, a manually operated high pressure fluid displacing device adapted to transmit fluid to said wheel cylinders, a manually operated low pressure fluid displacing device adapted to work in unison with said first device, a power operated booster having fluid displacing and receiving means adapted to receive the fluid displaced by said low pressure fluid displacing device and to transmit a proportionate volume under pressure to said wheel cylinders to augment the amount transmitted by said high pressure fluid displacing device, said booster having an expansible chamber connected to independently receive fluid from said low pressure fluid displacing device after power runout of said booster, resilient means urging to contract said expansible chamber, and a check valve operatively connected with said expansible chamber to close after a pre-determined expansion of said expansible chamber to check the flow of fluid from said wheel cylinders to said fluid displacing and receiving means of said booster after the latter has run out of power.

3. In a braking system having wheel cylinders to apply the brakes, a manually operated high pressure fluid displacing device adapted to transmit fluid to said wheel cylinders, a manually operated low pressure fluid displacing device adapted to work in unison with said first device, a power operated booster having fluid pressure receiving and transmitting means adapted to receive the fluid displaced by said low pressure fluid displacing device and to transmit a proportionate volume under pressure to said wheel cylinders to augment the amount transmitted by said high pressure fluid displacing device, means responsive to the power run-out of the booster to block the return of fluid from the wheel cylinders to said fluid pressure receiving and transmitting means of booster while the latter has insufficient power, means for relieving the fluid displaced by said low pressure fluid displacing device while said booster is unable to transmit fluid due to power run-out and retarding means to prevent a too sudden relief of pressure of the fluid displaced by said low pressure fluid displacing device.

4. In a braking system having wheel cylinders to apply the brakes, a pair of simultaneously manually operable fluid displacing devices one of which is adapted to transmit a small amount of fluid under higher pressure directly to said wheel cylinders, a booster comprising a power operated fluid displacing mechanism connected to transmit fluid under pressure to said wheel cylinders to augment the amount transmitted by said one device, said booster having an expansible chamber adapted to receive control fluid from the other of said fluid displacing devices, the intake of control fluid being proportionate to the output of fluid of said fluid displacing mechanism, means responsive to the pressure of said control fluid to increase the power of said booster to step up the output of said fluid displacing mechanism, and means responsive to an increased and predetermined pressure of said control fluid to prevent the return of fluid from said wheel cylinders to said fluid displacing mechanism of booster.

5. The construction as claimed in claim 4, and resiliently yielding means adapted to prevent the excessive build-up of pressure of the control fluid while said booster is unable to assist said master cylinder during power run-out.

6. The construction as claimed in claim 4, resiliently yieldable means adapted to prevent the excessive build-up of pressure of said control fluid while said booster is unable to assist said master cylinder during power run-out, and damping means to prevent a sudden relief of pressure of the control fluid.

7. The construction as claimed in claim 4, resiliently yieldable means adapted to prevent the excessive build-up of pressure of said control fluid while said booster is unable to assist said master cylinder during power run-out, and pressure sensitive means responsive to the hydraulic pressure in said wheel cylinders adapted to prevent the relief of pressure of said control fluid before a predetermined pressure is reached in said wheel cylinders.

8. In a braking system having wheel cylinders to apply the brakes, a master cylinder having a pair of simultaneously manually operable fluid displacing devices one of which is adapted to transmit a small amount of fluid directly to said wheel cylinders, the other displacing control fluid, a booster having a power operated fluid displacing chamber to transmit fluid under pressure to said wheel cylinders to augment the amount transmitted by said one device, a fluid receiving chamber operated in unison with said fluid displacing chamber arranged to receive control fluid from the other of said devices at a rate proportionate to the discharge from said fluid displacing chamber, pressure sensitive means responsive to the pressure of the control fluid displaced by said other device to increase the power of said booster and thereby increase the output of said fluid displacing chamber, said pressure sensitive means being adapted to receive control fluid from said master cylinder when said booster is arrested due to power run-out, a check valve to prevent the flow of fluid from said fluid receiving chamber to said pressure sensitive means and to said other fluid displacing device of said master cylinder after power run-out of said booster, and spring biased means opposed by the pressure of said control fluid transmitted from said master cylinder to open said check valve.

9. The construction according to claim 8, and a restricted passage arranged to slow down the flow of control fluid to said pressure sensitive means.

10. The construction according to claim 9, and a check valve arranged to provide a passage for a quick return of control fluid from said pressure sensitive means to said other fluid displacing device and to said fluid receiving chamber.

11. The construction according to claim 9 where said pressure sensitive means comprises resilient means to bias said pressure sensitive means into a released position where said booster is deenergized, and additional resilient means arranged to yieldingly oppose the overtravel of said pressure sensitive means in response to a higher control fluid pressure.

12. In a braking system having wheel cylinders to apply the brakes, a manually operated master cylinder having a control piston to transmit control fluid under very low pressure and a high pressure piston of relatively small cross-sectional area to transmit fluid to said wheel cylinders, said two pistons being arranged to move in unison, a booster comprising a power operated fluid displacing mechanism arranged to transmit fluid to said wheel cylinders to augment the amount delivered by said piston of small cross-sectional area, a chamber increasing proportionately with the displacement of fluid from said fluid displacing mechanism to receive control fluid from said master cylinder, means responsive to the pressure of said control fluid to control the power of said booster to increase the output of said fluid displacing mechanism, spring operated means to bias said means for controlling the power of said booster into a position to deenergize said booster, a check valve arranged to prevent the return of control fluid to said master cylinder, resilient means arranged to open said check valve, and means responsive to the hydraulic pressure of said control fluid transmitted by said master cylinder to oppose said resilient means to urge said check valve into a closed position.

13. The construction as claimed in claim 12, and means to provide for the relief of the control fluid in said master cylinder when a predetermined pressure is reached which is higher than the hydraulic pressure necessary to urge said means responsive to the pressure of the control fluid to increase the power of said booster.

14. The construction according to claim 12, where said control piston is slideable relative to said piston of small cross-sectional area, and a spring arranged to yieldingly urge said control piston to travel in unison with said piston of small cross-sectional area.

15. The construction according to claim 14, and means responsive to the hydraulic pressure of said wheel cylinders to prevent said control piston from yielding to said control fluid before a certain pressure is reached in said wheel cylinders.

16. The construction as claimed in claim 12, and means to relieve the hydraulic pressure of the system when said master cylinder is in the released position.

17. In a braking system having wheel cylinders to apply the brakes, a manually operated master cylinder having a control piston to transmit control fluid under very low pressure and a high pressure piston of small cross-sectional area to transmit fluid to said wheel cylinders, an auxiliary piston exposed to said control fluid and tended by spring means to resiliently yield to the pressure of said control fluid, a hydraulic fluid reservoir, a chamber containing hydraulic fluid behind said auxiliary piston, a valve to open a passage from said chamber to said reservoir, resilient means urging to close said valve, means responsive to the hydraulic pressure of said wheel cylinders to open said valve when a certain pressure is reached to make it possible for said auxiliary piston to yield to a higher pressure of said control fluid, a booster comprising a power operated fluid displacing mechanism, means for receiving the control fluid displaced by said control piston, means to control said booster to transmit an amount of fluid to said wheel cylinders proportional to the volume of control fluid received from said master cylinder, and a check valve arranged to prevent the return of control fluid to said master cylinder, a spring arranged to open said check valve, and means responsive to the hydraulic pressure of said control fluid to oppose said spring to urge said check valve into a closed position.

WILLIAM STELZER.

References Cited in the file of this patent

UNITED STATES PATENTS

| Number | Name | Date |
| --- | --- | --- |
| 1,834,368 | Arbuckle | Dec. 1, 1931 |
| 2,322,063 | Schnell | June 15, 1943 |
| 2,328,637 | Freeman | Sept. 7, 1943 |
| 2,352,357 | Almond | June 27, 1944 |
| 2,353,755 | Price | July 18, 1944 |